(12) United States Patent
Yoshida et al.

(10) Patent No.: US 6,291,102 B1
(45) Date of Patent: Sep. 18, 2001

(54) LITHIUM ION SECONDARY BATTERY

(75) Inventors: Yasuhiro Yoshida; Kouji Hamano; Hisashi Shiota; Shigeru Aihara; Takayuki Inuzuka; Michio Murai; Sho Shiraga, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,943

(22) PCT Filed: Dec. 15, 1997

(86) PCT No.: PCT/JP97/04600

§ 371 Date: Aug. 16, 1999

§ 102(e) Date: Aug. 16, 1999

(87) PCT Pub. No.: WO99/31748

PCT Pub. Date: Jun. 24, 1999

(51) Int. Cl.$^7$ ........................................................ H01M 4/58
(52) U.S. Cl. .................... 429/231.95; 429/232; 429/217; 429/145; 429/164
(58) Field of Search ................................ 429/231.95, 145, 429/247, 250, 217, 232, 164

(56) References Cited

U.S. PATENT DOCUMENTS 5,478,668 * 12/1995 Gozdz et al. ........................ 429/127
5,486,215 * 1/1996 Kelm et al. ........................ 29/623.1

* cited by examiner

Primary Examiner—Stephen Kalafut
Assistant Examiner—Angela J. Martin

(57) ABSTRACT

An object is to provide a lithium ion secondary battery which maintains the electrical connections between each active material layer and a separator without using a firm housing, can have an increased energy density, can take an arbitrary shape, such as a thin shape, exhibits excellent charge and discharge characteristics, and has a large battery capacity. Positive and negative electrode active material particles are bonded to their respective current collectors to form a positive electrode and a negative electrode. The positive and the negative electrode active material layers are joined to a separator with a binder resin so that the joint strength between the separator and the positive and the negative electrode active material layers may be equal to or greater than the joint strength between the positive and the negative electrode active material layers and the respective current collectors to prepare a tabular laminated battery body having a plurality of electrode laminates. An electrolytic solution containing lithium ions is held in the voids possessed by the positive and the negative electrode active material layers and the separator to make an electrical connection between electrodes.

10 Claims, 3 Drawing Sheets

LITHIUM ION SECONDARY BATTERY

TECHNICAL FIELD

This invention relates to a lithium ion secondary battery comprising a positive electrode and a negative electrode facing each other via a separator holding an electrolytic solution. More particularly, it relates to a battery structure which secures improved electrical connections between each of a positive electrode and a negative electrode and a separator without a firm metal-made housing so that a battery may have an arbitrary shape, such as a thin shape.

BACKGROUND OF THE INVENTION

There has been an eager demand for reduction in size and weight of portable electronic equipment, and the realization relies heavily on improvement of battery performance. To meet the demand, development and improvement of a variety of batteries have been proceeding. Battery characteristics expected to be improved include increases in voltage, energy density, resistance to high load, freedom of shape, and safety. Of currently available batteries, lithium ion batteries are the most promising secondary batteries for realizing a high voltage, a high energy density, and excellent resistance to high load and have been and will be given improvements.

A lithium ion secondary battery mainly comprises a positive electrode, a negative electrode, and an ion conducting layer interposed between the electrodes. The lithium ion secondary batteries that have been put to practical use employ a positive plate prepared by applying to an aluminum current collector a mixture comprising a powdered active material, such as a lithium-cobalt complex oxide, a powdered electron conductor, and a binder resin; a negative plate prepared by applying to a copper current collector a mixture of a powdered carbonaceous active material and a binder resin; and an ion conducting layer made of a porous film of polyethylene, polypropylene, etc. filled with a nonaqueous solvent containing lithium ions.

FIG. 5 schematically illustrates a cross section of a conventional cylindrical lithium ion secondary battery disclosed in JP-A-8-83608. In FIG. 5 reference numeral 1 indicates a battery case made of stainless steel, etc. which also serves as a negative electrode terminal, and numeral 2 an electrode body put into the case 1. The electrode body 2 has a roll form composed of a positive electrode 3 and a negative electrode 5 having a separator 4 therebetween. In order for the electrode body 2 to maintain electrical connections among the positive electrode 3, the separator 4, and the negative electrode 5, it is necessary to apply pressure thereto from outside. For this purpose, the electrode body 2 is put into a firm case 1 to apply pressure for maintaining all the planar contacts. In the case of rectangular batteries, an external pressing force is imposed to a bundle of strip electrodes by, for example, putting the bundle in a rectangular metal case.

That is, a contact between a positive electrode and a negative electrode in commercially available lithium ion secondary batteries has been made by using a firm housing made of metal, etc. Without such a housing, the electrodes would be separated at their interface, and the battery characteristics would be deteriorated due to difficulty in maintaining electrical connections. However, occupying a large proportion in the total weight and volume of a battery, the housing causes reduction in energy density of the battery. Moreover, being rigid, it imposes limitation on battery shape, making it difficult to make a battery of arbitrary shape.

Under such circumstances, development of lithium ion secondary batteries which do not require a firm housing has been proceeding, aiming at reductions in weight and thickness. The key to development of batteries requiring no housing is how to maintain an electrical connection between each of a positive electrode and a negative electrode and an ion conducting layer (i.e., separator) interposed therebetween without adding an outer force.

Joining means requiring no outer force that have been proposed to date include a structure in which electrodes (a positive and a negative electrode) are joined with a liquid adhesive mixture (gel electrolyte) as disclosed in U.S. Pat. No. 5,460,904 and a structure in which an active material is bound with an electron conducting polymer to form a positive and a negative electrode, and the electrodes are joined via a polyelectrolyte as disclosed in U.S. Pat. No. 5,437,692.

Conventional lithium ion secondary batteries having the above-mentioned structures have their several problems. Those in which a firm case is used for ensuring intimate contacts and electrical connections between electrodes and a separator have the problem that the case which does not participate in electricity generation has a large proportion in the total volume or weight of a battery, which is disadvantageous for production of batteries having a high energy density. On the other hand, the structure in which electrodes are joined with a liquid adhesive mixture needs a complicated production process and hardly shows sufficient adhesive strength for securing improved strength as a battery. The structure in which electrodes are joined with a polyelectrolyte is disadvantageous in that the polyelectrolyte layer should have a sufficient thickness for security, i.e., enough to prevent internal shortage between electrodes, failing to provide a sufficiently thin battery; a solid electrolyte is insufficient to join an electrolyte layer and an electrode active material, making it difficult to improve battery characteristics such as charge and discharge efficiency; and the production process is complicated, resulting in an increase of cost.

Efficiency in intercalation and disintercalation of lithium ions by active materials occurring on charging and discharging of a battery is an important factor decisive of the charge and discharge efficiency of a battery. In a battery of ordinary structure, because mobility of lithium ions is equal throughout an electrolytic solution, there is a problem that intercalation and disintercalation of lithium ions take place preferentially in the portion of the active material layer in the vicinity of the electrode surface, i.e., in the vicinity of the separator so that the active material in the inside of the electrode is not made effective use of. As a result, desired charge and discharge characteristics are hard to obtain.

Hence, in order to obtain a practical thin type lithium ion battery, it is required to develop a battery structure that exhibits satisfactory battery characteristics such as charge and discharge characteristics while easily securing safety and strength as a battery. That is, it is necessary that a separator is provided between electrodes for safety and that the separator and the electrodes are joined with sufficient strength and in such a manner that secures satisfactory battery characteristics.

In order to solve these problems, the inventors of the present invention have conducted extensive study on a favorable method for adhering a separator to a positive and a negative electrode. The present invention has been reached as a result. Accordingly, an object of the present invention is to provide a compact and stable lithium ion secondary battery in which a positive electrode, a negative electrode, and a separator are brought into firm and intimate contact without using a firm battery case, which can have an increased energy density, a reduced thickness, and a plurality of electrode laminates in an arbitrary shape, exhibits excellent charge and discharge characteristics, and has a large battery capacity.

DISCLOSURE OF THE INVENTION

A first structure of the lithium ion secondary battery according to the present invention comprises a plurality of electrode laminates each having a positive electrode comprising a particulate positive electrode active material bound to a positive electrode current collector by a binder resin, a negative electrode comprising a particulate negative electrode active material bound to a negative electrode current collector by a binder resin, and a separator which is interposed between the positive electrode and the negative electrode and joined to the positive and the negative electrode active material layers, the positive and the negative electrode active material layers and the separator holding a lithium ion-containing electrolytic solution in their voids, and the joint strength between the separator and the positive and the negative electrode active material layers being equal to or greater than the joint strength between the positive and the negative electrode active material layers and the respective current collectors. This structure has the effect that a firm housing is no longer necessary, which makes it feasible to reduce the weight and thickness of a battery and to design the battery shape freely, and there is provided a lithium ion secondary battery having improved charge and discharge efficiency, excellent charge and discharge characteristics, and high safety. A lithium ion secondary battery which can have an increased energy density and a reduced thickness, can take an arbitrary shape and exhibits excellent charge and discharge characteristics is obtained. Having a plurality of electrode laminates, the battery obtained is light in weight, compact, and stable and has a large battery capacity.

A second structure of the lithium ion secondary battery of the invention is the 1st structure, wherein the positive and the negative electrode active material layers are joined to the separator with the same binder resin that binds the particulate positive electrode active material and the particulate negative electrode active material to the respective current collectors. This structure brings about improved reliability.

A third structure of the lithium ion secondary battery of the invention is the first structure, wherein the covering ratio of the binder resin on the particulate active material located on the separator side is greater than that on the particulate active material located on the current collector side. According to this structure, the difference in rate of intercalation and disintercalation of lithium ions between the positive or negative active material on the separator side and that in the inside of the active material layer is narrowed. As a result, the active material inside the electrode can be made effective use of, bringing about improved charge and discharge efficiency.

A fourth structure of the lithium ion secondary battery of the invention is the first structure, wherein the plurality of electrode laminates are formed by interposing the positive electrode and the negative electrode alternately among a plurality of cut sheets of the separator.

A fifth structure of the lithium ion secondary battery of the invention is the first structure, wherein the plurality of electrode laminates are formed by interposing the positive electrode and the negative electrode alternately between rolled separators.

A sixth structure of the lithium ion secondary battery of the invention is the first structure, wherein the plurality of electrode laminates are formed by interposing the positive electrode and the negative electrode alternately between folded separators.

According to the fourth to sixth structures, there is easily obtained a battery having a multilayer structure which is excellent in charge and discharge characteristics, light, compact, and stable with a large capacity.

BEST MODE FOR CARRYING OUT THE INVENTION

The embodiments for carrying out the invention will be explained by way of the drawings.

Figure 1:
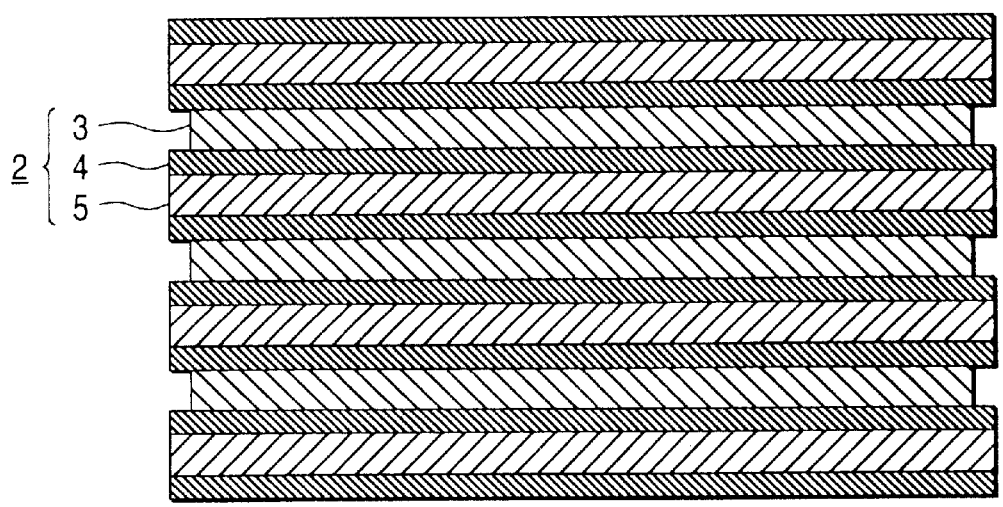
FIGS. 1, 2, and 3 are each a schematic cross section showing the battery structure of the lithium ion secondary battery according to an embodiment of the present invention.
Figure 2:
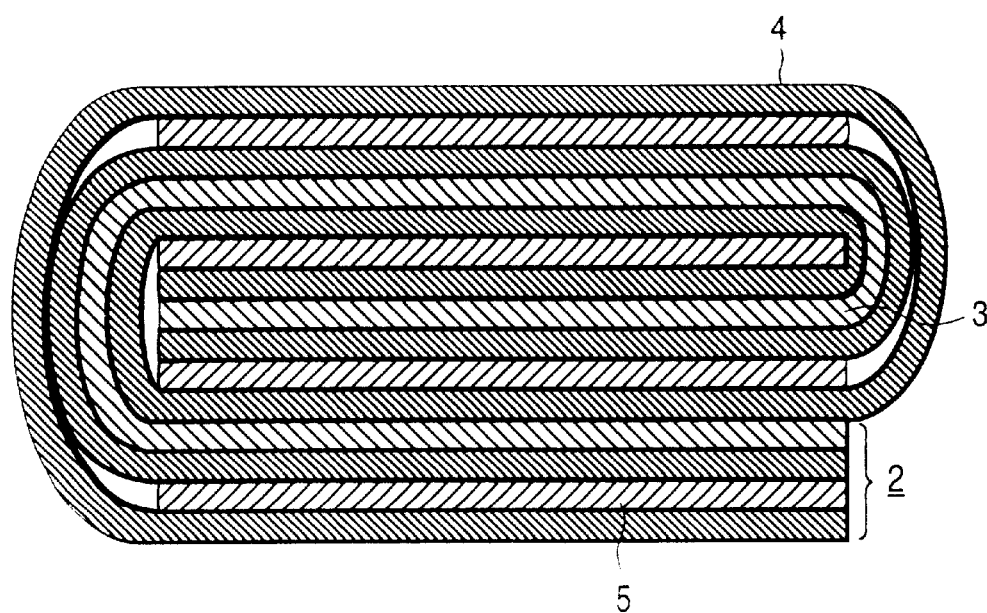
Figure 3:
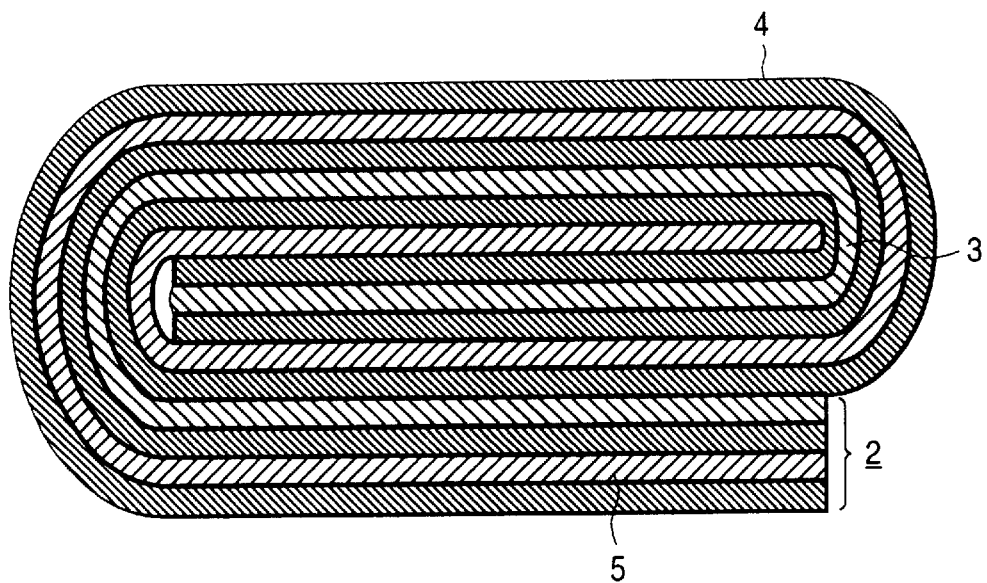
Figure 4:
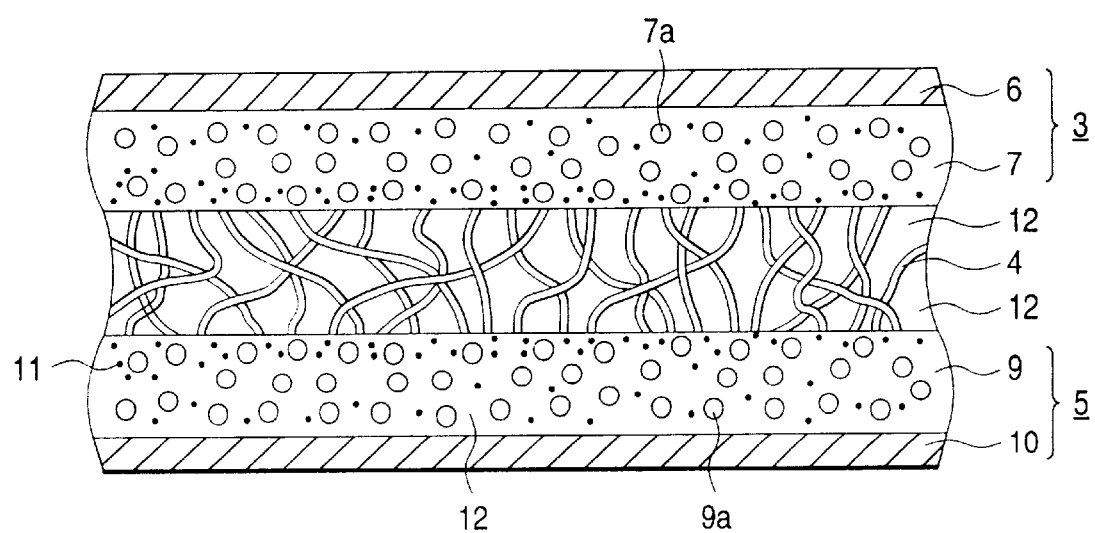
FIG. 4 is a schematic cross section illustrating the electrode laminate constituting the battery according to an embodiment of the invention.
Figure 5:
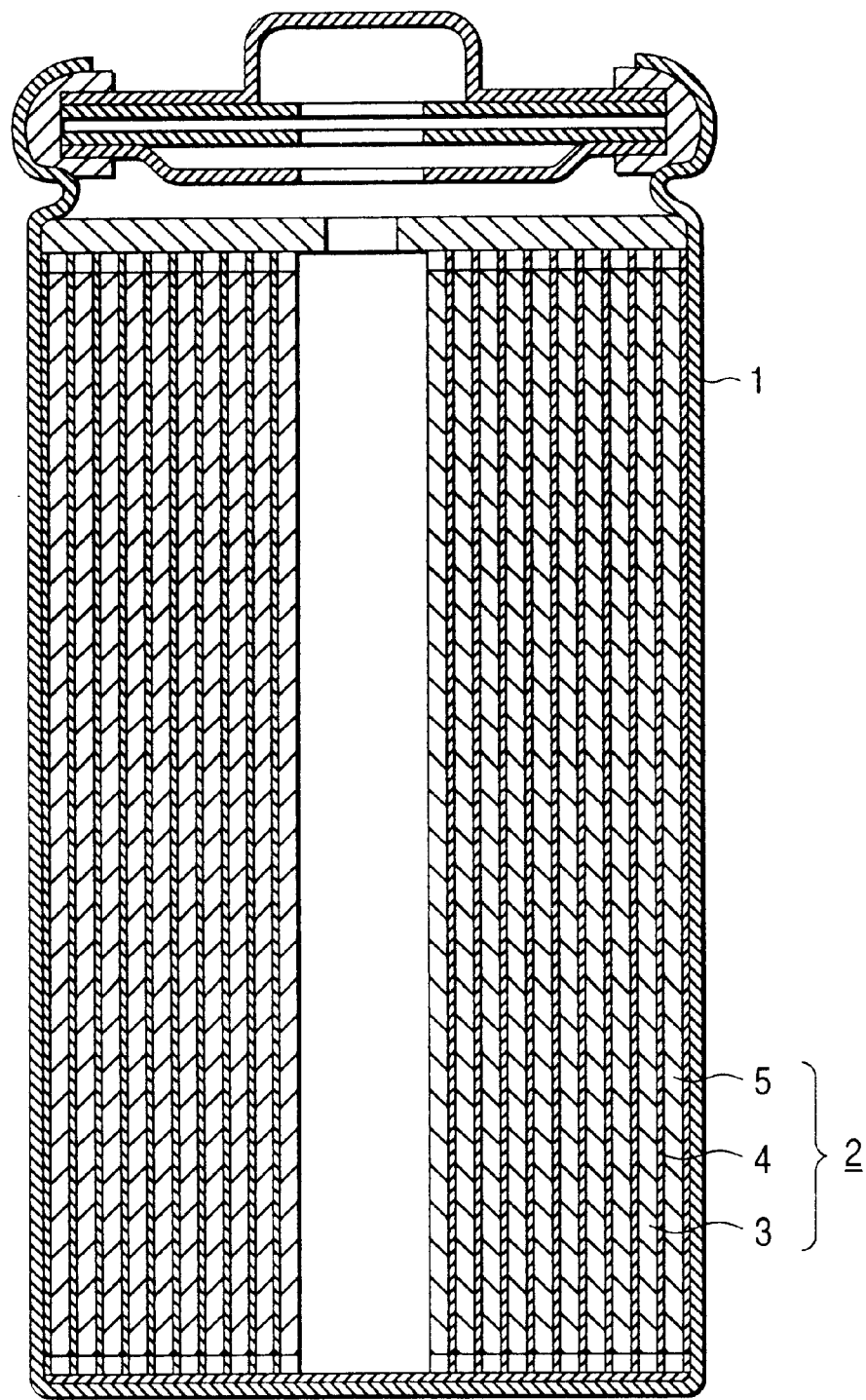
FIG. 5 is a schematic cross section showing an example of conventional lithium ion secondary batteries.

FIGS. 1 through 3 each show a schematic cross section illustrating the battery structure of the lithium ion secondary battery according to an embodiment of the invention. FIG. 1 shows a tabular laminated battery body having a plurality of electrode laminates 2 formed by successively building up a positive electrode 3, a separator 4, and a negative electrode 5. FIG. 2 shows a tabular roll type laminated battery body having a plurality of electrode laminates formed by rolling up a pair of separators 4 of band form having joined a positive electrode 3 of band form therebetween while inserting a plurality of negative electrodes 5. FIG. 3 shows a tabular roll type laminated battery body having a plurality of electrode laminates formed by disposing a positive electrode 3 of band form between a pair of separators 4 of band form with a negative electrode 5 of band form being disposed on one side of the paired separators 4 and rolling up the laminate into an oblong ellipsoid. FIG. 4 is a schematic cross-sectional view of an example of the electrode laminate 2 constituting the above-described batteries of the invention. In these Figures, numeral 3 indicates a positive electrode prepared by binding positive electrode active material particles 7a to a positive electrode current collector 6 by a binder resin 11; 7 a positive electrode active material layer made up of the positive electrode active material particles 7a bound together by the binder resin 11; 5 a negative electrode prepared by binding negative electrode active material particles 9a to a negative electrode current collector 10 by a binder resin 11; 9 a negative electrode active material layer made up of the negative electrode active material particles 9a bound together by the binder resin 11; 4 a separator interposed between the positive electrode 3 and the negative electrode 5 and joined to the positive and the negative electrode active material layers 7 and 9 by the binder resin 11; and 12 voids formed in the positive and the negative electrode active material layers 7 and 9 and the separator 4, in which a lithium ion-containing electrolytic solution is held.

The lithium ion secondary battery having the above constitution is produced by, for example, as follows.

Positive electrode active material particles 7a and a binder 11 are dispersed in a solvent to prepare active material paste.

The paste is applied to a positive electrode current collector 6 by roll coating and dried to prepare a positive electrode 3. A negative electrode 5 is prepared in the similar manner. Then, the binder resin 11 is applied as an adhesive to the separator 4. The positive electrode 3 or the negative electrode 5 is stuck to the separator 4, and the laminate is build up further, rolled up, and the like, as described above to prepare a multilayer battery body having a plurality of electrode laminates shown in FIGS. 1 to 3. The multilayer battery body is impregnated with an electrolytic solution by soaking, and the impregnated battery body is put in an aluminum laminate film pack. The opening of the pack is heat-sealed to obtain a lithium ion secondary battery having a multilayer structure.

The joint strength between the separator 4 and each of the positive and the negative electrode active material layers 7 and 9 is equal to or greater than the joint strength between the positive electrode current collector 6 and the positive electrode active material layer 7 and that between the negative electrode current collector 10 and the negative electrode active material layer 9. The covering ratio of the binder resin 11 on the positive and the negative active material particles 7a and 9a located on the separator side is greater than that on the active material particles located on the side of the positive and the negative electrode current collectors 6 and 10.

In this embodiment, the structure of the electrodes (the positive electrode 3 and the negative electrode 5) is retained by bonding the active material and the current collector with the binder resin 11 as in a conventional battery structure. The positive electrode 3 and the negative electrode 5 (i.e., the positive and the negative electrode active material layers 7 and 9) are similarly bonded to the separator 4 with the same binder resin 11. Thus, the electrical connections between the active material layers 7 and 9 and the separator 4 can be retained without applying outer force. Therefore, a firm housing for maintaining the battery structure is not necessary any longer, which makes it feasible to reduce the weight and thickness of the battery and to design the shape of the battery freely. Further, the adhesive strength between the positive and the negative electrode active material layers 7 and 9 and the separator 4 is equal to or greater than the strength bonding the active material and the current collector into an integral electrode, i.e., the adhesive strength between the positive electrode current collector 6 and the positive electrode active material layer 7 and between the negative electrode current collector 10 and the negative electrode active material layer 9. Therefore, fracture of the electrode takes place in preference to separation between the positive and the negative active material layers 7 and 9 and the separator 4. For example, in case some outer force that would deform the battery or some internal thermal stress is imposed, it is not the separator but the electrode structure that is broken, which is effective for keeping safety.

In order to further strengthen the adhesion between the electrodes and the separator and to enhance the above effect, it is preferred to form a thin binder resin layer between each electrode and the separator.

Intercalation and disintercalation of lithium ions usually take place preferentially in the portion on the separator 4 side in the positive and the negative active material layers 7 and 9. In the above embodiment, to the contrary, the difference in rate of intercalation and disintercalation of lithium ions between the active material on the separator side and that in the inside of the active material layer is narrowed because the binder resin of the adhesive is present in an larger amount in the portion on the separator 4 side (in the portion in the vicinity of the surface) of the positive and the negative electrode active material layers 7 and 9, i.e., the positive and the negative active material particles 7a and 9a located in the vicinities of the separator 4 are covered with a larger amount of the binder resin 11 than those located in the vicinities of the positive and the negative electrode current collectors 6 and 10. As a result, the active material inside the electrode can be made effective use of, and the charge and discharge efficiency is improved. There is thus exerted an excellent effect that the charge and discharge characteristics as a battery can be improved.

In addition, according to the above embodiment, impregnation with an electrolytic solution can be achieved with ease. That is, the tabular laminated battery body is soaked in an electrolytic solution under reduced pressure, whereby the gas in the voids 12 formed in the positive and the negative electrode active material layers 7 and 9 and the separator 4 are displaced with the electrolytic solution. The impregnated tabular laminated battery body is preferably dried.

Impregnation with an electrolytic solution can also be conducted by putting the tabular laminated battery body into a flexible case such as an aluminum laminated film pack, evacuating the case to bring the case into tight contact with the outer surface of the tabular laminated battery body, pouring an electrolytic solution into the case from the opening of the case to make it penetrate into at least the voids, and sealing the opening the case. According to this method, since the back side of the battery body is in tight contact with the case when the electrolytic solution is supplied, the electrolytic solution is prevented from going behind the back side of the battery body and from becoming waste that does not participate in electrolysis. This also contributes to reduction in battery weight.

The active materials which can be used in the positive electrode include complex oxides of lithium and a transition metal, such as cobalt, nickel or manganese; chalcogen compounds containing lithium; or complex compounds thereof; and these complex oxides, Li-containing chalcogen compounds or complex compounds thereof that contain various dopant elements. While any substance capable of intercalating and disintercalating lithium ions, which take the main part of a battery operation, can be used as a negative electrode active material, preferred active materials for use in the negative electrode include carbonaceous compounds, such as graphitizing carbon, non-graphitizing carbon,-polyacene, and polyacetylene; and aromatic hydrocarbon compounds having an acene structure, such as pyrene and perylene. These active materials are used: in a particulate form. Particles having a particle size of 0.3 to 20 $\mu$m can be used. A preferred particle size is 1 to 5 $\mu$m. Where the particle size is too small, too large a surface area of the active material will be covered with the adhesive on being adhered, and lithium ion intercalation and disintercalation are not carried out efficiently at charge and discharge, resulting in reduction of battery characteristics. If the particle size is too large, it is not easy to form the active material mixture into a thin film, and the packing density is reduced. Further, the electrode plate will have a considerably uneven surface which may tend to hinder adhesion to the separator.

The binder resins which can be used for binding an active material into an electrode plate include those which neither dissolve in an electrolytic solution nor undergo electrochemical reaction inside an electrode laminate. For example, a fluorocarbon resin or a mixture mainly comprising a fluorocarbon resin, polyvinyl alcohol or a mixture mainly comprising polyvinyl alcohol can be used. Specific examples of useful binder resins include polymers or copolymers containing a fluorine atom in the molecular structure thereof, e.g., vinylidene fluoride or tetrafluoroethylene, polymers or copolymers having vinyl alcohol in the molecular skeleton thereof, and their mixtures with polymethyl methacrylate, polystyrene, polyethylene, polypropylene, polyvinylidene chloride, polyvinyl chloride, polyacrylonitrile or polyethylene oxide. Polyvinylidene fluoride, which is a fluorocarbon resin, is particularly suitable.

Any metal stable within a battery can be used as a current collector. Aluminum is preferred for a positive electrode, and copper is preferred for a negative electrode. The current collector can be foil, net, expanded metal, etc. Those presenting a large void area, such as net and expanded metal, are preferred from the standpoint of ease of holding an electrolytic solution after adhesion.

Any electron-insulating separator that has sufficient strength, such as porous film, net, and nonwoven fabric, can be used. In some cases, for example, where a fluorocarbon resin is used as a separator, adhesive strength should be secured by a surface treatment such as a plasma treatment. While not particularly limiting, polyethylene or polypropylene is a preferred material for the separator for their adhesiveness and safety.

The solvent and the electrolyte which provide an electrolytic solution serving as an ion conductor can be any of nonaqueous solvents and any of lithium-containing electrolyte salts that have been employed in conventional batteries. Examples of useful solvents include ethers, such as dimethoxyethane, diethoxyethane, diethyl ether, and dimethyl ether; esters, such as propylene carbonate, ethylene carbonate, diethyl carbonate, and dimethyl carbonate; and mixed solvents consisting of two members selected from the ether solvents or the ester solvents or mixed solvents consisting of one member selected from the former group and one member selected from the latter group. Examples of useful electrolyte salts used in the electrolytic solution are $LiPF_6$, $LiAsF_6$, $LiClO_4$, $LiBF_4$, $LiCF_3SO_3$, $LiN(CF_3SO_2)_2$, and $LiC(CF_3SO_2)_3$.

The adhesive resins which can be used for joining a current collector and an electrode and the adhesive resins which can be used for joining an electrode and a separator include those which neither dissolve in the electrolytic solution nor undergo electrochemical reaction inside a battery and are capable of forming a porous film, such as a fluorocarbon resin or a mixture mainly comprising a fluorocarbon resin and polyvinyl alcohol or a mixture mainly comprising polyvinyl alcohol. Specific examples of useful resins include polymers or copolymers containing a fluorine atom in the molecular structure thereof, e.g., vinylidene fluoride or tetrafluoroethylene, polymers or copolymers having vinyl alcohol in the molecular skeleton thereof, and their mixtures with polymethyl methacrylate, polystyrene, polyethylene, polypropylene, polyvinylidene chloride, polyvinyl chloride, polyacrylonitrile or polyethylene oxide. Polyvinylidene fluoride, which is a fluorocarbon resin, is particularly suitable.

The present invention will now be illustrated in greater detail with reference to Examples, but the present invention is by no means limited thereto.

EXAMPLE 1

Eighty-seven parts by weight of $LiCoO_2$, 8 parts by weight of graphite powder (KS-6, produced by Lonza (co.ltd)) and, as a binder resin, 5 parts by weight of polyvinylidene fluoride were dispersed in N-methylpyrrolidone (hereinafter abbreviated as NMP) to prepare positive electrode active material paste. The paste was applied to a 20 $\mu$m-thick aluminum foil as a positive electrode current collector with a doctor blade to a coating thickness of about 100 $\mu$m to form a positive electrode.

Ninety-five parts by weight of Mesophase Microbead Carbon (a trade name, produced by Osaka Gas Co., Ltd.) and 5 parts by weight of polyvinylidene fluoride as a binder resin were dispersed in N-methylpyrrolidone to prepare negative electrode active material paste. The paste was applied to a 12 $\mu$m-thick copper foil as a negative electrode current collector with a doctor blade to a thickness of about 100 $\mu$m to make a negative electrode.

A 5 wt % NMP solution of polyvinylidene fluoride which was used as a binder resin for bonding the active material particles to the current collector was applied uniformly to a side each of two separators (Cellguard #2400, produced by Hoechst Celanese). Before the NMP solution of polyvinylidene fluoride dried, the negative electrode 5 was sandwiched and joined in between a pair of the separators 4 with their sides coated with the NMP solution of polyvinylidene fluoride facing inward. The laminate was dried in a warm air drier at 60° C. for 2 hours to evaporate NMP thereby to bond the negative electrode 5 between the two separators 4. The pair of the separators 4 having the negative electrode 5 bonded therebetween was punched to obtain a cut piece of prescribed size. The NMP solution of polyvinylidene fluoride was applied uniformly to one side of the cut laminate, and a cut piece of the positive electrode 3 having a prescribed size was stuck thereto to prepare a laminate composed of the separator 4, the negative electrode 5, the separator 4, and the positive electrode 3 in this order. Another pair of separators having the negative electrode joined therebetween was cut to a prescribed size, and the NMP solution of polyvinylidene fluoride was applied to a side of the cut laminate. The coated side was stuck to the positive electrode of the previously prepared laminate. The above-described steps were repeated to build up a battery body having a plurality of electrode laminates each composed of the positive electrode and the negative electrode facing each other via the separator. The battery body was dried while applying pressure to prepare a tabular laminated battery body as shown in FIG. 1. Current collecting tabs each connected to the end of every positive current collectors and every negative current collectors of the tabular laminated battery body were spot-welded among the positive electrodes and among the negative electrodes, respectively, to establish parallel electrical connections in the tabular laminated battery body.

The tabular laminated battery body was impregnated with an electrolytic solution consisting of ethylene carbonate and 1,2-dimethoxyethane as a mixed solvent and lithium hexafluorophosphate as an electrolyte and was put in an aluminum laminated film pack. The opening of the pack was heat-sealed to complete a lithium ion secondary battery.

The resulting battery stably retained its shape to maintain the electrical connections among electrodes without imposing pressure from outside. When the aluminum laminate film was removed from the assembled battery, and the electrode was stripped off the separator, the active material layer came off while being adhered to the separator, proving that the adhesive strength between the separator and the active material layer in the vicinity of the electrode surface was greater than the adhesive strength between the active material layer and the current collector within the electrode. This is considered to be because the binder resin was present as an adhesive in a larger amount in the portion of the positive and the negative active material layers on the separator side than in the portion on the current collector side. Because fracture of the electrode occurs in preference to the separation between the positive and the negative active material layers and the separator, safety can be secured.

As a result of evaluation of the battery characteristics, a weight energy density of about 100 Wh/kg was obtained owing to effective utilization of the active materials inside the electrodes. The charge capacity after 200 charge and discharge cycles at a current of C/2 was as high as 75% of the initial one. This seems to be because the binder resin existed in the portion on the separator side in a greater amount. In other words, the active material particles present in the portion on the separator side were covered with the binder resin over a wider area more than the active material particles present in the portion on the current collector side so that the difference in rate of intercalation and disintercalation of lithium ions between the active material on the separator side and that in the inside of the active material layer was reduced, and the active material inside the electrode could be utilized effectively.

Thus, since a firm housing is unnecessary, it is possible to reduce the weight and thickness of the battery; the battery can take an arbitrary shape; and the charge and discharge efficiency is improved. As a result, a lithium ion secondary battery which is excellent in charge and discharge characteristics and highly safe and can have a great capacity is obtained.

Example 1 may be carried out by repeating the steps of bonding the positive electrode 3 between a pair of separators 4, applying the adhesive resin solution to a side of the paired separators 4 having the positive electrode 3 therebetween, adhering the negative electrode 5 to the coated side, and adhering another paired separators having the positive electrode therebetween onto the negative electrode 5.

EXAMPLE 2

A battery having a multilayer structure was prepared in the same manner as in Example 1, except for changing the thickness of the positive and the negative electrode to about 200 $\mu$m. Similarly to Example 1, the resulting battery stably retained its shape and the electrical connections among electrodes without applying pressure from outside. When the aluminum laminate film was removed from the assembled battery, and the electrode was stripped off the separator, the active material layer was separated while being adhered to the separator, proving that the adhesive strength between the separator and the active material layer in the vicinity of the electrode surface was greater than the adhesive strength between the active material layer and the current collector within the electrode. As a result of evaluation of the battery characteristics, a weight energy density of 113 Wh/kg was obtained, and the charge capacity after 200 charge and discharge cycles at a current of C/2 was as high as 60% of the initial one. Similarly to Example 1, there was obtained a large capacity lithium ion secondary battery having excellent charge and discharge characteristics which could have a reduced thickness and an arbitrary shape.

EXAMPLE 3

A positive electrode and a negative electrode were prepared in the same manner as in Example 1. A 12 wt % NMP solution of polyvinylidene fluoride was used for adhesion of the separator and the electrode. Similarly to Example 1, the resulting battery stably retained its shape and the electrical connections among electrodes without imposing pressure from outside. When the aluminum laminate film was removed from the assembled battery, and the electrode was stripped off the separator, the active material layer was separated while being adhered to the separator, proving that the adhesive strength between the separator and the active material layer in the vicinity of the electrode surface was greater than the adhesive strength between the active material layer and the current collector within the electrode. The high concentration solution of polyvinylidene fluoride provided a thin polyvinylidene fluoride layer between the separator and the electrode. Thus, the adhesive strength was further enhanced, and the electrical connections were maintained stably. As a result of evaluation of the battery characteristics, a weight energy density of about 100 Wh/kg was obtained, and the charge capacity after 200 charge and discharge cycles at a current of C/2 was as high as 60% of the initial one. Similarly to Example 1, a lithium ion secondary battery having excellent charge and discharge characteristics which can have a reduced thickness and an arbitrary shape was obtained.

EXAMPLE 4

Eighty-seven parts by weight of $LiCoO_2$, 8 parts by weight of graphite powder (KS-6, produced by Lonza) and, as a binder resin, 5 parts by weight of polystyrene powder were mixed, and adequate amounts of toluene and 2-propanol were added thereto to prepare positive electrode active material paste. The paste was applied to a 20 $\mu$m-thick aluminum foil as a positive electrode current collector with a doctor blade to a coating thickness of about 100 $\mu$m to form a positive electrode.

Ninety-five parts by weight of Mesophase Microbead Carbon (a trade name, produced by Osaka Gas Co., Ltd.) and, as a binder resin, 5 parts by weight of polystyrene powder were mixed, and adequate amounts of toluene and 2-propanol were added thereto to prepare negative electrode active material paste. The paste was applied to a 12 $\mu$m-thick copper foil as a negative electrode current collector with a doctor blade to a thickness of about 100 $\mu$m to make a negative electrode.

A tabular laminated battery body as shown in FIG. 1 was prepared in the same manner as in Example 1, except for using a nitrocellulose porous film (pore size: 0.8 $\mu$m) as a separator and a 5 wt % toluene solution of polystyrene, which was used as a binder resin, as an adhesive for joining the positive and the negative electrodes (i.e., the positive and the negative electrode active material layers) to the separator. Current collecting tabs connected to the positive and the negative current collectors of the tabular laminated battery body were spot-welded among the positive electrodes and among the negative electrodes to establish parallel electrical connections in the tabular laminated battery body. Subsequently, the tabular laminated battery body was impregnated with an electrolytic solution consisting of ethylene carbonate and 1,2-dimethoxyethane as a mixed solvent and lithium hexafluorophosphate as an electrolyte and was put in an aluminum laminated film pack. The opening of the pack was heat-sealed to complete a lithium ion secondary battery.

The resulting battery stably maintained its shape and the electrical connections without imposing pressure from outside. When the aluminum laminate film was removed from the assembled battery, and the electrode was stripped off the separator, the active material layer was separated while being adhered to the separator, proving that the adhesive strength between the separator and the active material layer in the vicinity of the electrode surface was greater than the adhesive strength between the active material layer and the current collector within the electrode. As a result of evaluation of the battery characteristics, a weight energy density of about 90 Wh/kg was obtained, and the charge capacity after 100 charge and discharge cycles at a current of C/10 was as high as about 60% of the initial one.

Similarly to Example 1, a lithium ion secondary battery having excellent charge and discharge characteristics which could have a reduced thickness and an arbitrary shape was obtained.

EXAMPLE 5

A positive electrode and a negative electrode were prepared in the same manner as in Example 1. A battery having a tabular laminate structure was prepared in the same manner as in Example 1, except for using a 10 wt % toluene solution of a 1:2 (by weight) mixture of polyvinylidene fluoride, which was the binder resin used for adhering the active material particles to the current collector, and polymethacrylic acid for adhering the separator and the electrode. Drying after adhesion was carried out by heating at 80° C. in vacuo. Similarly to Example 1, the resulting battery stably maintained its shape without imposing pressure from outside. When the aluminum laminate film was removed from the assembled battery, and the electrode was stripped off the separator, the active material layer was separated while being adhered to the separator, proving that the adhesive strength between the separator and the active material layer in the vicinity of the electrode surface was greater than the adhesive strength between the active material layer and the current collector within the electrode. As a result of evaluation of the battery characteristics, a weight energy density of 95 Wh/kg was obtained, and the charge capacity after 100 charge and discharge cycles at a current of C/2 was as high as about 80% of the initial one. Similarly to Example 1, a lithium ion secondary battery having excellent charge and discharge characteristics which could have a reduced thickness and an arbitrary shape was obtained.

EXAMPLE 6

A negative electrode 5 and a positive electrode 3 were prepared in the same manner as in Example 1. A 5 wt % NMP solution of polyvinylidene fluoride, which was the binder resin used for adhering the active material particles to the current collector, was uniformly applied to a side each of two separators (Cellguard #2400, produced by Hoechst Celanese) of band form. The positive electrode of band form was sandwiched and stuck between the two separators with their coated sides inward, and the laminate was put in a warm air drier at 60° C. for 2 hours to evaporate NMP from the resin solution, whereby the positive electrode was joined between the pair of separators. The 5 wt % NMP solution of polyvinylidene fluoride was then applied uniformly to one of the paired separators of band form having the positive electrode therebetween. One end of the coated separator was folded back at a prescribed length while inserting a cut piece of the negative electrode 5 having a prescribed size into the fold, and the laminate was passed through a laminator. Subsequently, the 5 wt % NMP solution of polyvinylidene fluoride was uniformly applied to the other separator of band form, and another piece of the negative electrode having a prescribed size was stuck thereto at the position corresponding to the negative electrode having been inserted into the fold. The paired separators were rolled up by half turn to make an oblong ellipsoid in such a manner that the negative electrode might be wrapped in. The separators were repeatedly rolled up while inserting a cut piece of the negative electrode for every half turn to form a battery body having a plurality of electrode laminates. The battery body was dried while applying pressure to obtain a tabular roll type laminated battery body as shown in FIG. 2.

Current collecting tabs connected to the end of every negative electrode current collector of the tabular roll type laminated battery body were spot-welded to achieve parallel electrical connections. The tabular roll type laminated battery body was impregnated with an electrolytic solution and sealed to complete a lithium ion secondary battery in the same manner as in Example 1.

Similarly to Example 1, the resulting tabular roll type laminated battery body stably maintained its shape without imposing pressure from outside. When the aluminum laminate film was removed from the assembled battery, and the electrode was stripped off the separator, the active material layer was separated while being adhered to the separator, proving that the adhesive strength between the separator and the active material layer in the vicinity of the electrode surface was greater than the adhesive strength between the active material layer and the current collector within the electrode. As a result of evaluation of the battery characteristics, a weight energy density of 90 Wh/kg was obtained, and the charge capacity after 100 charge and discharge cycles at a current of C/2 was as high as about 80% of the initial one.

Similarly to Example 1, a lithium ion secondary battery having excellent charge and discharge characteristics which can have a reduced thickness and an arbitrary shape was obtained.

While Example 6 has shown an embodiment in which a pair of separators 4 of band form having the positive electrode 3 of band form therebetween are rolled up while inserting and adhering the negative electrode 5 of prescribed size for every half turn, the battery body may be such that is prepared by rolling up a pair of separators of band form having the negative electrode 5 of band form therebetween while inserting and adhering a cut piece of the positive electrode 3 having a prescribed size for every half turn.

While Example 6 has shown a method in which the separators 4 are rolled up, the method may be replaced with a method comprising folding a pair of separators 4 of band form having joined therebetween the negative electrode 5 or the positive electrode 3 of band form while inserting and adhering a cut piece of the positive electrode 3 or the negative electrode 5 of prescribed size in every fold.

EXAMPLE 7

A negative electrode 5 and a positive electrode 3 were prepared in the same manner as in Example 1. The positive electrode 3 of band form was set between a pair of separators of band form (Cellguard #2400, produced by Hoechst Celanese), and the negative electrode 5 of band form was placed on the outer side of one of the separators 4 with a prescribed length of its starting end sticking out over the end of that separator 4. The inner sides of the paired separators 4 and the outer side of the separator 4 on which the negative electrode 5 was to be arranged had been uniformly coated with a 5 wt % NMP solution of polyvinylidene fluoride, which was the binder resin used for adhering the active material particles to the current collector. The sticking end of the negative electrode 5 was first sent to a laminator, and the negative electrode 5, the separator 4, the positive electrode 3, and the separator 4 were then passed through the laminator to form a laminate of band form. The outer side of the other separator of the laminate was uniformly coated with a 5 wt % NMP solution of polyvinylidene fluoride, and the sticking end of the negative electrode 5 was folded back and stuck to the coated surface. The laminate was rolled up in such a manner that the folded negative electrode 5 might be wrapped in to make an oblong ellipsoid to form a battery body having a plurality of electrode laminates as shown in FIG. 3. The battery body was dried under pressure to join the negative electrode, the separator, and the positive electrode simultaneously to prepare a tabular roll type laminated battery body. The battery body was impregnated with an electrolytic solution and sealed in the same manner as in Example 1 to complete a battery.

Similarly to Example 1, the resulting tabular roll type laminated battery body stably maintained its shape without imposing pressure from outside. When the aluminum laminate film was removed from the assembled battery, and the electrode was stripped off the separator, the active material layer was separated while being adhered to the separator, proving that the adhesive strength between the separator and the active material layer in the vicinity of the electrode surface was greater than the adhesive strength between the active material layer and the current collector within the electrode. As a result of evaluation of the battery characteristics, a weight energy density of 80 Wh/kg was obtained, and the charge capacity after 100 charge and discharge cycles at a current of C/2 was as high as about 80% of the initial one.

Similarly to Example 1, a lithium ion secondary battery having excellent charge and discharge characteristics which could have a reduced thickness and an arbitrary shape was obtained.

While Example 7 has shown an embodiment in which a pair of separators 4 of band form having the positive electrode 3 of band form therebetween and the negative electrode 5 of band form on the outer side of one of the separators 4 are rolled up, the same type of a battery could be prepared by arranging the negative electrode 5 of band form in between the separators 4 of band form and the positive electrode 3 on one of the separators 4, and rolling up the laminate.

In Example 7, batteries were prepared with a varied number of the laminates. The battery capacity increased with the number of the laminates.

COMPARATIVE EXAMPLE

Eighty-seven parts by weight of $LiCoO_2$, 8 parts by weight of graphite powder (KS-6, produced by Lonza ) and, as a binder resin, 5 parts by weight of polyvinylidene fluoride were dispersed in. N-methylpyrrolidone (hereinafter abbreviated as NMP) to prepare positive electrode active material paste. The paste was applied to a 20 $\mu$m-thick aluminum foil as a positive electrode current collector with a doctor blade to a coating thickness of about 100 $\mu$m.

Ninety-five parts by weight of Mesophase Microbead Carbon (a trade name, produced by Osaka Gas Co., Ltd.) and 5 parts by weight of polyvinylidene fluoride as a binder resin were dispersed in N-methylpyrrolidone to prepare negative electrode active material paste. The paste was applied to a 12 $\mu$m-thick copper foil as a negative electrode current collector with a doctor blade to a thickness of about 100 $\mu$m.

Before the applied paste dried, the aluminum foil coated with the positive electrode active material and the copper foil coated with the negative electrode active material were piled up alternately with a separator (Cellguard #2400, produced by Hoechst Celanese) being interposed therebetween. The laminate was pressed from both sides and dried to prepare a tabular laminated battery body having a plurality of electrode laminates as shown in FIG. 1. The positive electrodes and the negative electrodes were spot-welded among themselves to electrically connect them in parallel. The tabular laminated battery body was impregnated with an electrolytic solution consisting of ethylene carbonate and 1,2-dimethoxyethane as a mixed solvent and lithium hexafluorophosphate as an electrolyte and was put in an aluminum laminated film pack. The opening of the pack was heat-sealed to complete a lithium ion secondary battery.

The resulting battery stably maintained its shape without applying pressure from outside. The aluminum laminate film was removed from the assembled battery, and the electrode was stripped off the separator. The active material was found to remain on the separated separator only sparsely, proving that the adhesive strength between the separator and the active material layer in the vicinity of the electrode surface was extremely lower than the strength between the active material layer and the current collector within the electrode. It turned out that the active material layer had scarcely adhered to the separator. As a result of evaluation of the battery characteristics, a weight energy density of 70 Wh/kg was obtained, and the charge capacity after 200 charge and discharge cycles at a current of C/2 was as low as 40% of the initial one.

Compared with the foregoing Examples, the battery characteristics were considerably inferior. It has now been verified that the battery characteristics are improved by joining the positive and the negative electrodes to the separator with an adhesive. In other words, it is seen that distribution of the adhesive, i.e., the binder resin makes a great contribution to the improvement of battery characteristics.

The binder to be used does not always need to be the same as the binder used for adhesion of the active material layer. Different binders may be employed.

Industrial Applicability

The present invention provides batteries which can have reduced size and weight and an arbitrary shape as well as improved performance and can be used in portable electronic equipment, such as portable personal computers and cellular phones.

What is claimed is:

1. A lithium ion secondary battery comprising a plurality of electrode laminates each having a positive electrode comprising a particulate positive electrode active material bound to a positive electrode current collector by a binder resin, a negative electrode comprising a particulate negative electrode active material bound to a negative electrode current collector by a binder resin, a separator which is interposed between the positive electrode and the negative electrode and joined to the positive and the negative electrode active material layers with a binder resin, and the positive and the negative electrode active material layers and the separator hold a lithium ion-containing electrolytic solution in their voids, wherein the positive and negative electrode active material particles near the separator are covered with a larger amount of binder resin than the positive and negative electrode active material particles near the positive or negative electrode current collectors, thereby providing a joint strength between the separator and the positive and the negative electrode active material layers which is equal to or greater than the joint strength between the positive and the negative electrode active material layers and the respective current collectors.

2. A lithium ion secondary battery according to claim 1, wherein the positive and the negative electrode active material layers are joined to the separator with the same binder resin that binds the particulate positive electrode active material and the particulate negative electrode active material to the respective current collectors.

3. A lithium ion secondary battery according to claim 1, wherein the plurality of electrode laminates are formed by interposing the positive electrode and the negative electrode alternately among a plurality of cut sheets of the separator.

4. A lithium ion secondary battery according to claim 1, wherein the plurality of electrode laminates are formed by interposing the positive electrode and the negative electrode alternately between rolled separators.

5. A lithium ion secondary battery according to claim 1, wherein the plurality of electrode laminates are formed by interposing the positive electrode and the negative electrode alternately between folded separators.

6. The lithium ion secondary battery according to claim 1, wherein the amount of the active material particles in each of the positive and negative electrode material layers is lower near the separator than near each of the positive and negative current collectors.

7. The lithium ion secondary battery according to claim 1, wherein the amount of the binder resin in each of the positive and negative electrode material layers is higher near the separator than near each of the positive and negative current collectors.

8. The lithium ion secondary battery according to claim 1, wherein the active material particles have a particle size in a range of 0.3 to 20 $\mu$m.

9. The lithium ion secondary battery according to claim 1, wherein the active material particles have a particle size in a range of 1 to 5 $\mu$m.

10. A lithium ion secondary battery comprising a plurality of electrode laminates each having a positive electrode comprising a particulate positive electrode active material bound to a positive electrode current collector by a binder resin, a negative electrode comprising a particulate negative electrode active material bound to a negative electrode current collector by a binder resin, a separator which is interposed between the positive electrode and the negative electrode and joined to the positive and the negative electrode active material layers, and the positive and the negative electrode active material layers and the separator hold a lithium ion-containing electrolytic solution in their voids, wherein the amount of the active material particles in each of the positive and negative electrode material layers is lower near the separator than near each of the positive and negative current collectors.

* * * * *